United States Patent
Fleming

[15] 3,692,095
[45] Sept. 19, 1972

[54] ULTRA-LOW TEMPERATURE THERMAL REGENERATOR

[72] Inventor: Robert B. Fleming, Scotia, N.Y.
[73] Assignee: General Electric Company
[22] Filed: Dec. 5, 1969
[21] Appl. No.: 882,487

[52] U.S. Cl. ..................165/4, 62/6, 165/10
[51] Int. Cl..............................F28d 17/02
[58] Field of Search ...........165/4, 39, 10, 2; 62/6

[56] References Cited

UNITED STATES PATENTS

| 2,879,976 | 3/1959 | Rose, Sr................165/39 X |
| 3,216,484 | 11/1965 | Gifford....................165/4 |
| 3,270,802 | 9/1966 | Lindberg....................165/2 |
| 3,280,586 | 10/1966 | Funakoshi..............165/4 X |
| 3,215,194 | 11/1965 | Sununu et al..........165/4 X |
| 3,289,743 | 12/1966 | Biro........................165/10 |

*Primary Examiner*—Samuel W. Engle
*Attorney*—Paul A. Frank, John F. Ahern, Julius J. Zaskalicky, Frank L. Neuhauser, Oscar B. Waddell and Joseph B. Forman

[57] ABSTRACT

In a regenerator in which a fluid serves as the heat storage medium, axial motion of the fluid in the reservoir deteriorates the performance of the regenerator. Barriers are provided in the reservoir to significantly impede the flow of reservoir fluid in the longitudinal direction.

9 Claims, 7 Drawing Figures

PATENTED SEP 19 1972

Inventor:
Robert B. Fleming,
by Julius J. Zoshalick
His Attorney.

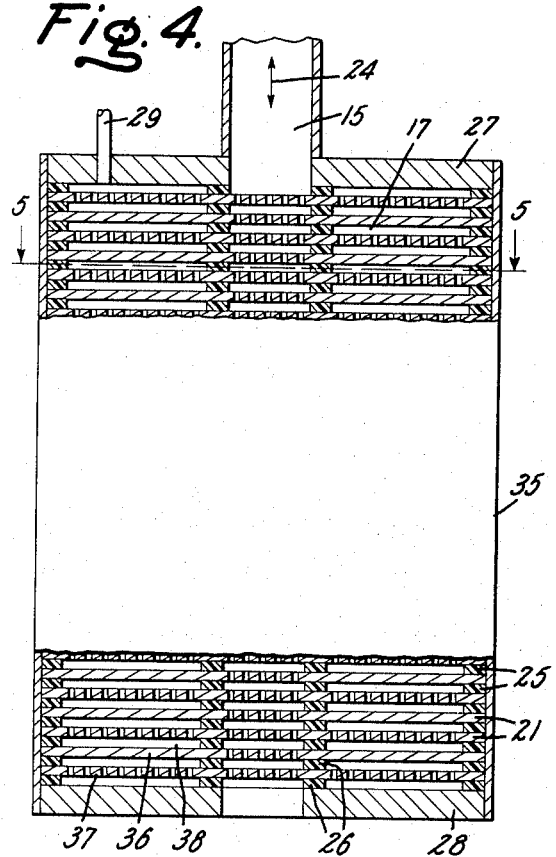
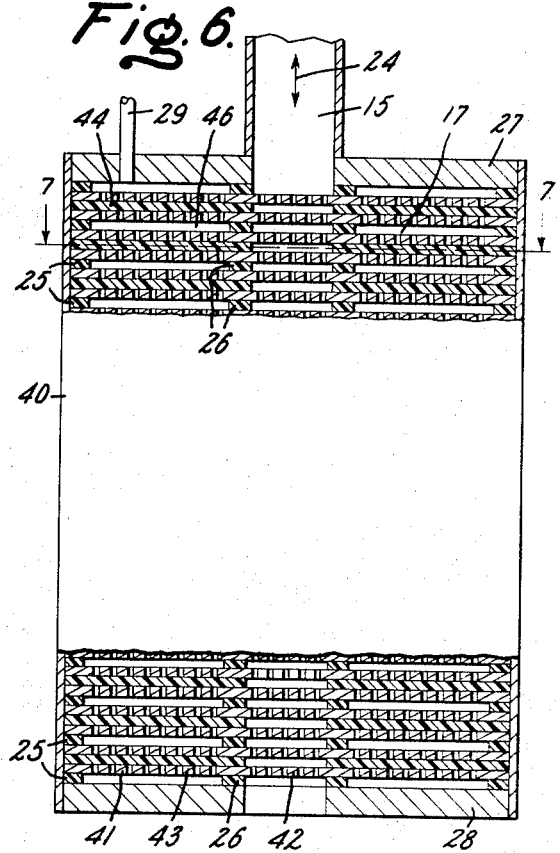
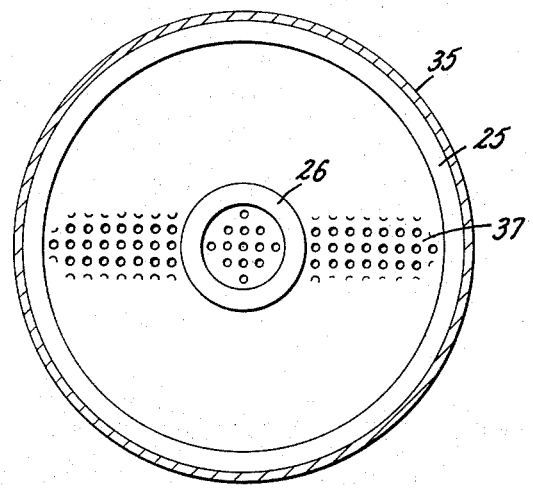
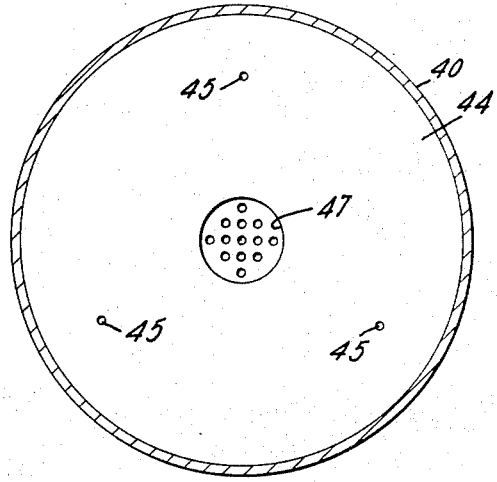
Inventor:
Robert B. Fleming,
by His Attorney.

ULTRA-LOW TEMPERATURE THERMAL REGENERATOR

The present invention relates to thermal regenerators for use in cryogenic refrigerators of the Gifford-McMahon or Stirling variety and, in particular, to improvements in regenerators utilizing a pressure controlled helium reservoir positioned adjacent to but physically separate from the flow channel in which the refrigerant flows. The present invention is an improvement in the invention described in a copending patent application Ser. No. 738,535, filed June 30, 1968 and assigned to the assignee of the present invention. The invention herein described was made in the course of or under a contract or subcontract thereunder with the Department of the Air Force.

In the aforementioned copending patent application, there is shown and described a thermal regenerator including a channel for the flow of refrigerant and a reservoir containing helium adjacent to but separate from the channel. A plurality of porous or perforated plates substantially parallel to and thermally insulated from one another are provided extending into the fluid flow channel and the reservoir. The direction of flow through the flow channel is normal to the plates. The plates provide good heat conduction between the flow channel and the reservoir. The helium in the reservoir sequentially receives, stores and transmits heat to the cyclically flowing refrigerant in the flow channel. While minimum temperatures of 7.6° K have been attained by the regenerator, such performance does not represent the full potential of the porous perforator plate regenerator.

It was observed in the operation of the thermal regenerator described above that large pressure fluctuations of the same frequency as the refrigerator pressure fluctuations occur within the helium reservoir. These fluctuations are attributable to the cyclical temperature changes which occur within the reservoir as a result of adding and withdrawing of heat from the stored helium. For example, assuming an ideal gas at a temperature of 10° K. in the reservoir, a temperature fluctuation of plus or minus 1° K would cause a pressure variation of roughly plus or minus 10 percent for a constant volume. However, at 5° K, the same temperature fluctuation would cause a pressure variation of roughly plus or minus 20 percent. Because the fluid at any given point within the reservoir is connected through perforations to all other points within the reservoir, the pressure variations are forced to be approximately the same magnitude along the axial or longitudinal length of the reservoir. Thus, helium density fluctuations of differing magnitude exist along the length of the regenerator. Such fluctuations produce a reciprocating axial fluid motion of the helium. Such axial fluid motion serves to conduct heat longitudinally throughout the reservoir causing a deterioration of regenerator performance.

Accordingly, the present invention is directed to the provision of means for preventing axial fluid motion within the reservoir or regenerators of the character described above without appreciably affecting its efficacy in other respects in performing its regenerative function to the end that improved performance in the regenerator, particularly with regard to obtaining lower temperatures, is attained.

In accordance with an illustrative embodiment of the present invention, there is provided a plurality of high conductivity substantially identical plates each having a first region and second region adjacent thereto. The plates are disposed to be substantially parallel to one another and in insulated relationship. The first regions of the plates are perforated and aligned to form a channel for the flow of refrigerant fluid. The second regions of the plates are enclosed to form a reservoir for helium. The plate and separator of the reservoir are structured and organized to provide within the reservoir a plurality of chambers each having a small axial extent in the direction of the flow axis of the refrigerant flow channel and having a large extent in the direction perpendicular thereto. Small holes are provided in the walls of the chambers to restrict the flow therebetween.

The novel features believed characteristic of the invention are set forth in the appended claims. The invention itself, together with further objects and advantages thereof may best be understood by reference to the following description taken in connection with the accompanying drawings wherein:

FIG. 4 is a top view, partially in section, of a thermal regenerator in accordance with another embodiment of the present invention.

FIG. 5 is a sectional view of the thermal regenerator of FIG. 4 taken along lines 5—5 of FIG. 4.

FIG. 6 is a top view, partially in section, of a thermal regenerator in accordance with a further embodiment of the present invention.

FIG. 7 is a sectional view of the thermal regenerator of FIG. 6 taken along lines 7—7 of FIG. 6.

Figure 1:
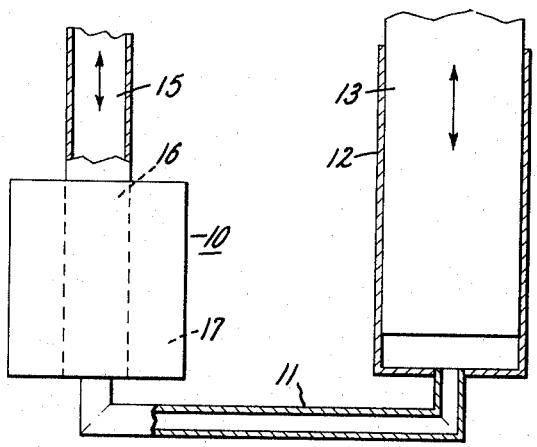
FIG. 1 is a simplified, partially sectionalized view of a thermal regenerator of the kind described in this patent application connected for operation in the coolest stage of a Gifford-McMahon cycle.

The thermal regenerators of the kind disclosed in this application operate in a Gifford-McMahon or Stirling refrigerator, such as is shown in simplified form in FIG. 1, wherein a thermal regenerator 10 is connected through a crossover tube 11 to an expansion chamber 12. While FIG. 1 shows only a single regenerator, that is, the coldest regenerator and piston of the refrigerator, in actual practice a plurality of such stages would be cascaded to obtain temperatures below 16° K. A piston 13 is axially disposed within chamber 12 and suitable means (not shown) are connected to the upper end of the piston to reciprocate the piston within the chamber at a convenient rate generally between 100 to 200 strokes per minute. In the operation of the regenerator 10, high pressure helium refrigerant is admitted to the regenerator through conduit 15 connected to channel 16 of the refrigerator and piston 13 is raised to approximately one-fourth the length of its stroke within the chamber 12 whereupon admission of high pressure gas is terminated and the system is sealed. The admission of the high pressure helium refrigerant to channel 16 also effects a heat transfer from the refrigerant to helium reservoir 17 through the porous or perforated plates thereof, which will be described below in connection with the various embodiments of the invention, to reduce any thermal gradients therebetween. Further upward motion of the piston causes a reduction in pressure of the closed system, and a consequent cooling of the gas by adiabatic expansion. The system is then opened above the regenerator and piston 13 is returned to a downward position to exhaust the cooled helium refrigerant through conduit 15. As the cooled helium flows through the central channel 16 of the regenerator the heat which has been stored by the helium reservoir 17 during the admission of the high pressure gas to the regenerator is returned to the expanded helium refrigerant gas and the helium reservoir is further cooled by heat conductivity through the plates of the regenerator. Upon exhaust of the expanded helium refrigerant from the regenerator high pressure gas is readmitted to the regenerator 10 to repeat the cooling cycle. Thus the temperature of the helium reservoir of the regenerator is incrementally reduced with each cycle until the portion of the reservoir adjacent the bottom plate thereof reaches a desired lower limit close to 6° K. Because a reduction in the helium reservoir temperature tends to lower the reservoir pressure, helium is admitted into the reservoir 17 from a source of helium during operation to maintain the pressure of the reservoir at a suitable level of, for example 10 atmospheres, notwithstanding the reduced temperature of the reservoir.

Because the helium within the reservoir of thermal regenerator must accept heat from the high pressure gas during the initial portion of each cycle and retain the heat until the expanded low pressure gas passes in the opposite direction to the channel of the regenerator, a high heat capacity per unit length of the regenerator is desirable to limit the size of the regenerator and the heat losses associated therewith. Helium at constant pressure shows a generally rising volumetric heat capacity with decreasing temperature because of the rise in density, and in fact shows an approximate two fold increase in heat capacity between 15° K and 8° K. Because the amount of heat capable of being retained by the reservoir 17 is dependent upon the density of the helium gas therein, the heat capacity of the reservoir can be altered simply by addition of helium to vary the pressure therein. Similarly, the capacity of the reservoir can be increased by extending the reservoir outward in a direction perpendicular to the axis of flow in the flow channel 16.

Figure 2:
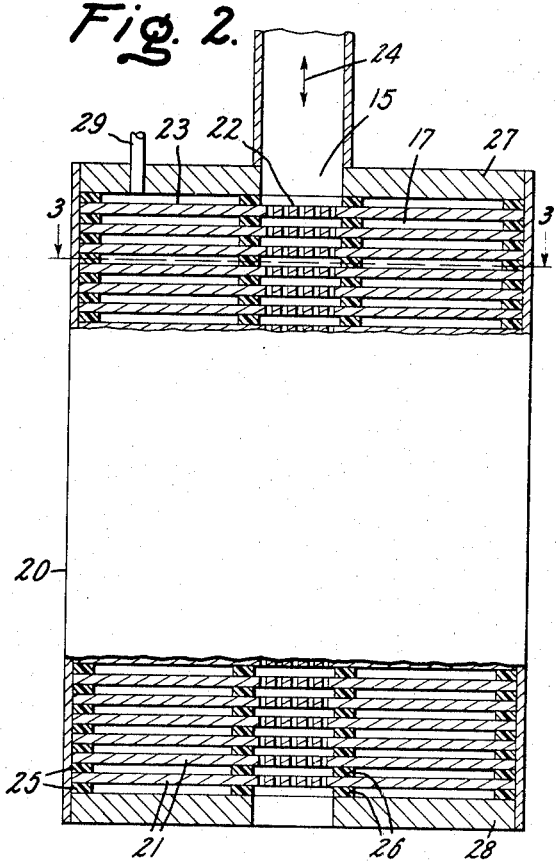
FIG. 2 is a top view, partly in section, of a thermal regenerator in accordance with one embodiment of the present invention.
Figure 3:
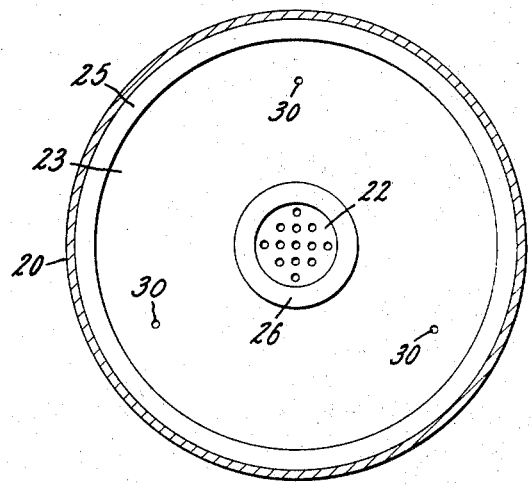
FIG. 3 is a sectional view of the thermal regenerator of FIG. 2 taken along lines 3—3 thereof.

Referring now to FIGS. 2 and 3, there is shown one embodiment of a regenerator in accordance with the present invention. The thermal regenerator 20 shown generally includes a centrally disposed channel 15 for the cyclic flow of a helium refrigerant therethrough with a relatively stagnant helium reservoir 17 being provided in the form of an annulus circumferentially disposed about the central channel 15 to serve as matrix material for sequentially receiving, storing and returning heat to the refrigerant flowing in the central channel. A plurality of parallel plates 21 having a first region 22 and a second annular region 23 concentric therewith are situated in insulated relationship with respect to one another perpendicular to the cyclic flow direction of the refrigerant shown by double headed arrow 24. The plates 21 function as heat conductors during regenerator operation to rapidly reduce a thermal gradient existing between the helium in the reservoir 17 and the flowing refrigerant. The plates 21 are made of a material such as aluminum having a high thermal diffusivity to reduce the thermal response time of the plates. The thermal time constant should be a small fraction, for example, less than half, of the regenerator cycle. The time constant is defined as the time required to effect about two-thirds of the total temperature change at the center of the plate in response to a temperature change at the periphery of the plate. To inhibit heat conduction in the direction of a refrigerant flow, that is along the longitudinal axis of the regenerator, adjacent plates 21 are separated by nonconducting or insulating separators 25 and 26 of annular outline with the diameter of annular separators or spacers 25 being larger than the diameter of annular separator 26. The internally positioned separators or spacers 26 function to form a side wall separating the helium refrigerant from the heating reservoir 17 thereby defining a flow channel 15 for the helium refrigerant. The externally disposed spacers 25 serve to form an exterior side wall of the helium reservoir 17. The plates 21 are bonded to the separators 25 and 26 to form a hermetic seal. Preferably, the volume of the annular reservoir 17 is considerably larger, that is about eight fold, the volume of the central channel 15 to assure sufficient heat capacity in the helium reservoir during the regenerator operation. Top plate 27 and bottom plate 28 each having centrally disposed apertures for the passage of helium refrigerant therethrough serve to generally seal the ends of the annular reservoir 17 included between the sides formed by the spacers 25 and 26 and the plates 21 sandwiched between the spacers. A port or conduit 29 is provided in the upper plate 27 to enable filling the reservoir and controlling the pressure thereof as explained in the aforementioned patent application.

Referring now particularly to FIG. 3, plate 21 has a circular first region 22 included within separator 26 and an annular second region 23 surrounding the first region and included between the separator 25 and the separator 26. The first region 22 of the plate is porous or perforated to permit refrigerant to flow therethrough. The second region 23 of the plate is imperforate or solid except for several small holes 30, for example three as shown, extending from one face to the opposite face thereof. The total cross-sectional area of the holes 30 is very small in relation to the total area of the plate 21, for example, it may be 1/100,000 of the total area of the plate, i.e., the total opening area provides a slow leak to enable the chambers between plates to be filled slowly, but not so fast as to permit appreciable movement of helium in the longitudinal or axial direction of reservoir during the cyclical operation of the regenerator.

Referring now to FIGS. 4 and 5 there is shown a regenerator 35 including a plurality of high conductivity substantially identical plates of a first kind 36 and a second kind 37, each having a circular first region and a second region concentric therewith. The first region of each of the plates 36 and 37 of the first and second kind are porous or perforated. The second regions of the plates 36 of the first kind have several small holes to provide very limited flow of fluid therethrough. The plates 36 may be identical to the plates 21 of FIG. 3.

The second regions of the plates 37 of the second kind are porous or perforated as shown in FIG. 5. The plates 36 of the first kind are interleaved with plates 37 of the second kind. The plates 36 and 37 are spaced substantially parallel to one another and are maintained in insulated relationship with respect to one another by a plurality of low conductivity annular separators 25 and 26. The first regions of the plates 36 and 37 are aligned and in conjunction with the annular separators 26 provide a channel for the flow of refrigerant therethrough. Similarly, the second regions of the plates 36 and 37 are aligned and a second group of low conductivity annular separators 25 surrounding the first group of annular separators and enclosing the second regions of the plates provide a fluid reservoir with a plurality of chambers 38 therein. Each of the chambers extends a short distance in the direction of flow axis of the flow channel and extends a relatively larger distance in a direction perpendicular thereto. The plates 36 form the end walls of the chambers. In other respects the regenerator 35 is identical to the regenerator of FIG. 2 and identical elements are identically designated.

It will be appreciated that a regenerator may include several hundred plates and each of the plates may be of the order of ten thousandths of an inch thick. The separators may be of the same thickness of the plates. While every other plate is shown as a solid plate with a few holes, such as shown in FIG. 3, i.e., plate 36 of the first kind, such nonconsecutively ordered plates may be more remotely spaced, for example every fifth plate may be a plate of the first kind.

Referring now to FIGS. 6 and 7 there is shown a regenerator 40 including a plurality of high conductivity plates 41, each having a first circular region 42 and a second region 43 concentric therewith. Plate 41 is identical to plate 37 of FIG. 3 with first and second regions of each of the plates being perforated. The plates 41 are spaced substantially parallel to one another and are maintained in insulated relationship with respect to one another by a plurality of low conductivity annular separators 25, 26 and 44. A pair of annular separators 25 and 26, such as utilized in the embodiments of FIG. 2 and are interleaved with separators 44 of the kind shown in FIG. 7. The first regions of the plates 41 are aligned and, in conjunction with the separators 26 and 44, provide a channel 15 for the flow of refrigerant therethrough. Similarly, the second regions of the plates 41 are aligned to provide a reservoir 17 with a plurality of chambers 46 therein. The annular separators 25 are included in the sides of the chambers 46 and the separators 44 form partitions between the chambers 46. Each of the chambers 46 extends a short distance in the direction of the flow axis of the flow channel and extends a relatively large distance in a direction perpendicular thereto.

Referring now particularly to FIG. 7 there is shown a view of an annular insulator 44 having a central opening 47 extending from one face to an opposed face and forming a part of the wall of the channel 15. The opening 47 encompasses the first region 42 of the plate 41. The separator 44 extends over the second region of the plate 43 to the periphery of the reservoir. The separator has several small holes 45, for example, three as shown, extending from one face to the opposite face thereof. As in the case of holes 30 in the plate of FIG. 3 the holes 45 are very small in cross section, i.e., just sufficient to provide limited access of one chamber formed between a separator 44 and an adjacent chamber. The access should be sufficient to permit filling of the reservoir yet not so large as to permit appreciable flow of helium from one chamber to an adjacent chamber during cyclical operation of the regenerator such as would permit appreciable heat to move in the longitudinal direction of the regenerator. Of course, the nonconsecutive planar separators may be spaced more remotely spaced than every other one, for example, they may be spaced at every fifth separator position, if desired. In other respects the regenerator 40 is identical to the regenerator of FIG. 2 and identical elements are identically designated.

What I claim as new and desire to secure by Letters Patent of the United States is:

1. A regenerator comprising
   a plurality of high conductivity substantially identical plates, each having a first region and a second region adjacent to said first region,
   said plates being spaced substantially parallel to one another thermally insulated from one another with the first regions thereof aligned and the second regions thereof aligned,
   said first region of each of said plates being porous,
   means for enclosing said first regions of said plates to provide a channel for the flow of fluid therethrough,
   means for enclosing said second regions of said plates to form a fluid reservoir with a plurality of chambers therein, each chamber being of small extent in the direction of the flow axis of said channel, each chamber being of large extent in a direction perpendicular thereto, and each chamber being provided with a slow leak to enable a gaseous refrigerant to flow into and out of said chamber slowly so K not to permit appreciable movement of said refrigerant in said reservoir in the direction of the flow axis of said flow channel during the cyclical operation of the regenerator.

2. The combination of claim 1 in which each of said chambers is formed between said second regions of adjacent plates and a pair of nonconducting separators interposed between and in contact with each of said adjacent plates, said second regions of said plates being provided with a few small holes extending from one face of a plate to the opposite face thereof.

3. The combination of claim 1 in which each of said chambers is formed between said second regions of adjacent nonconsecutive plates and several nonconducting separators, each separator interposed between and in contact with adjacent plates and included between said nonconsecutive plates, said second regions of said adjacent nonconsecutive plates being provided with a few small holes extending from one face of a plate to the opposite face thereof, the second region of each of the plates included between said nonconsecutive plates being porous.

4. The combination of claim 1 in which each of said chambers is formed between adjacent nonconsecutive nonconducting separators of one type and several nonconducting separators of another type included between said nonconsecutive separators, each of said nonconsecutive separators of said one type extending over said second region of an adjacent plate and being provided with a few small holes extending from one face to the opposite face thereof to provide access to an adjacent chamber, the second region of the plates included between said nonconsecutive separators being porous.

5. The combination of claim 1 in which said regions are coaxial.

6. The combination of claim 5 in which said first region is surrounded by said second region.

7. The combination of claim 5 in which said first region is circular and said second region is concentric therewith.

8. The combination of claim 1 in which said reservoir is filled with helium gas.

9. The combination of claim 1 in which said reservoir is provided with a port for control of the pressure and mass of helium in said reservoir.

* * * * *